June 24, 1924.
W. F. NAULIN
1,499,026
MACHINE FOR OPERATING UPON MILK
Filed June 1, 1923 6 Sheets-Sheet 1
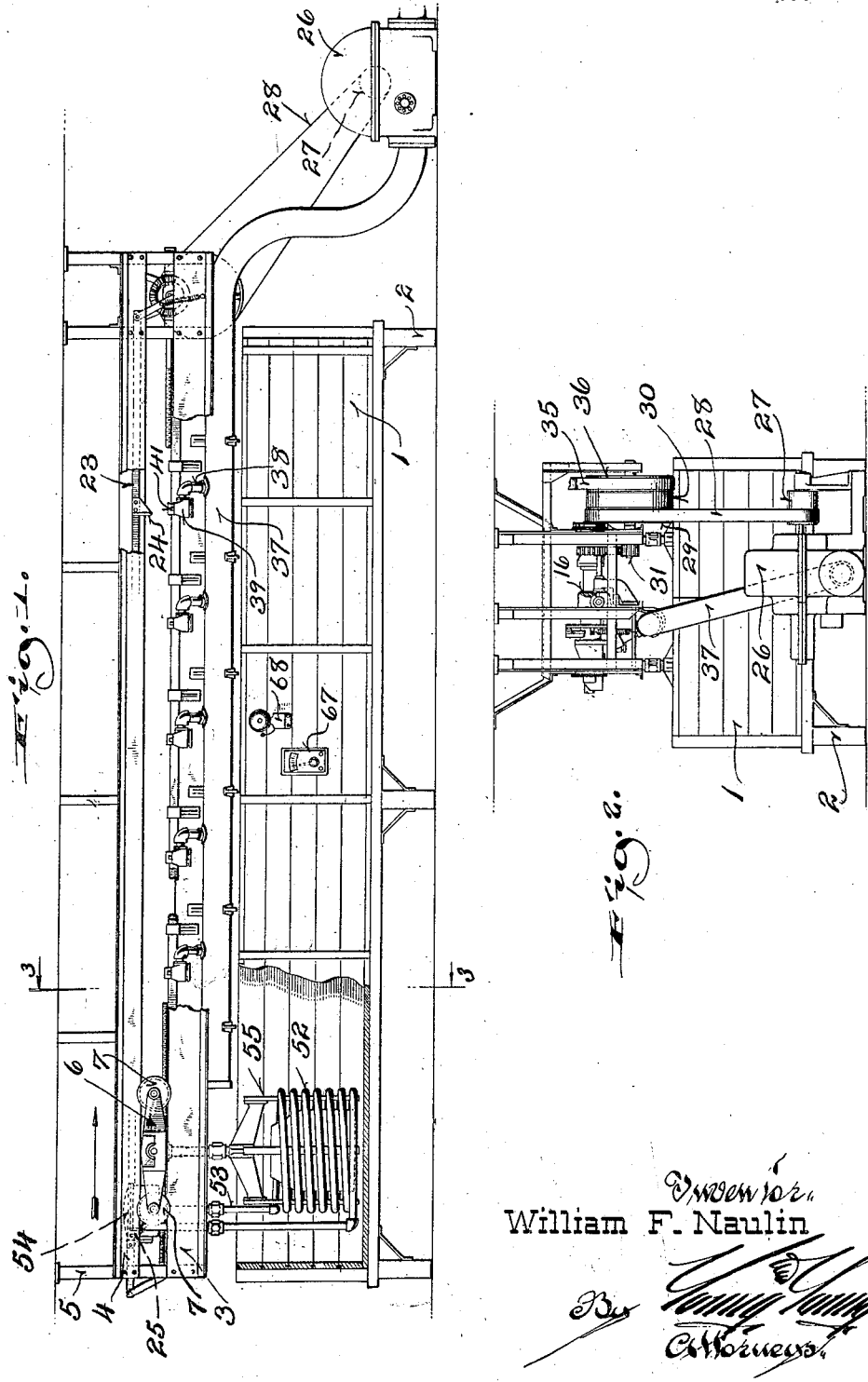
William F. Naulin

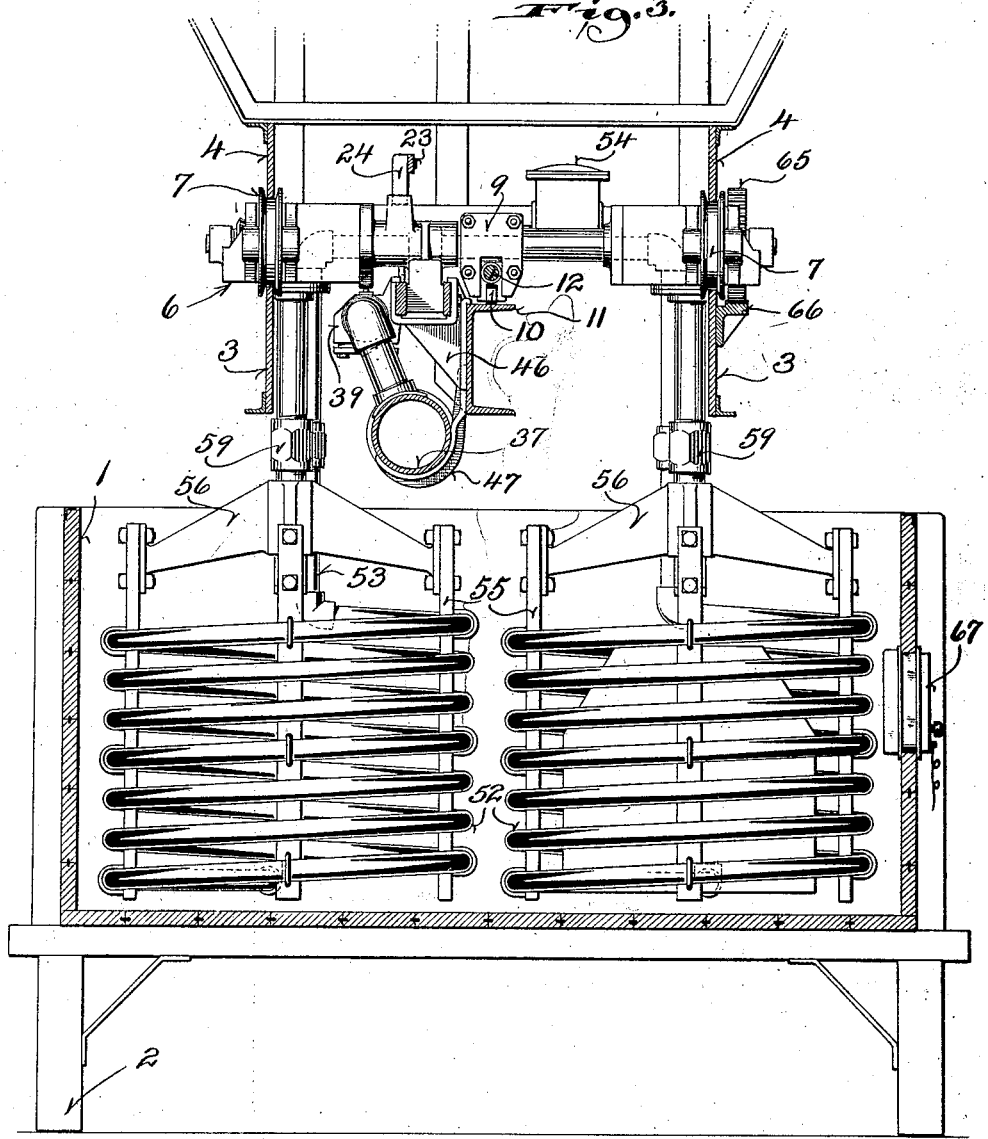

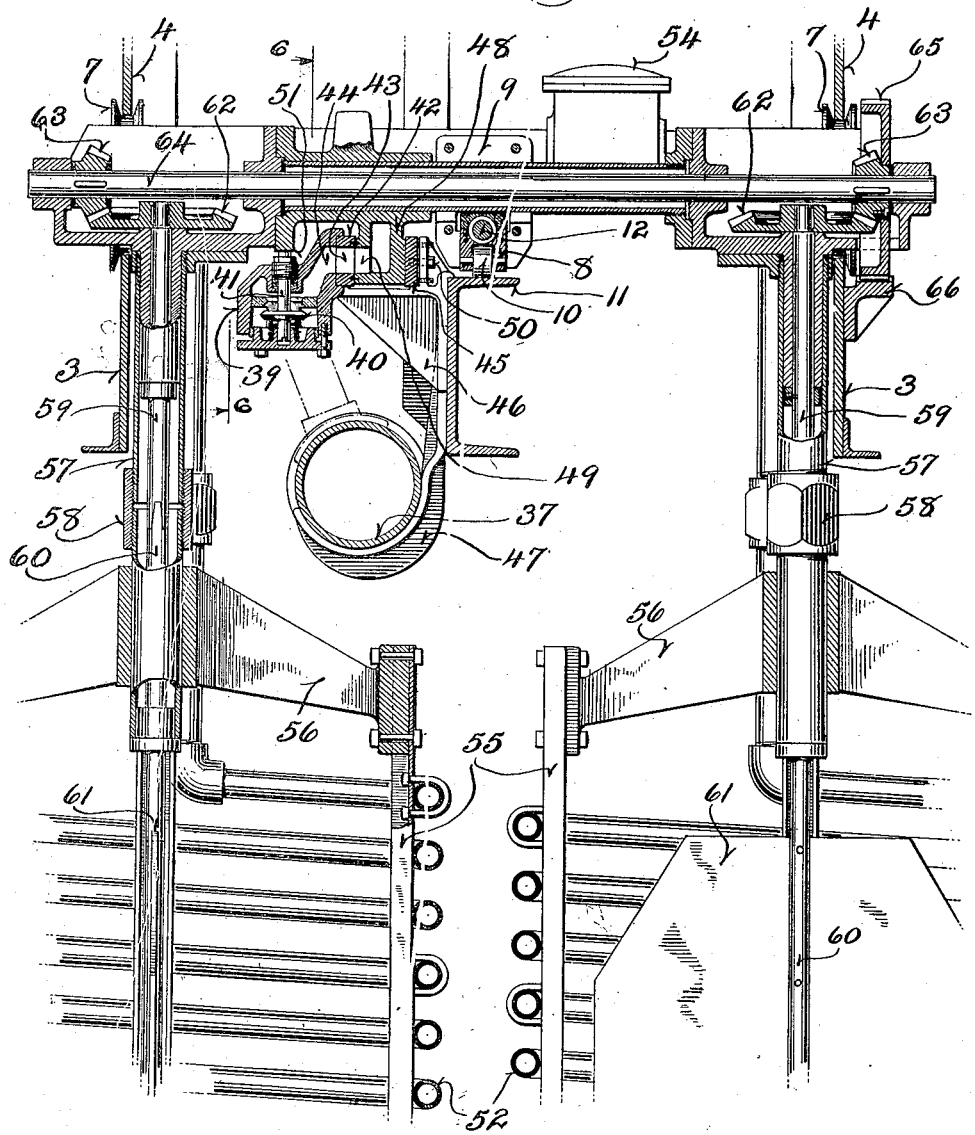

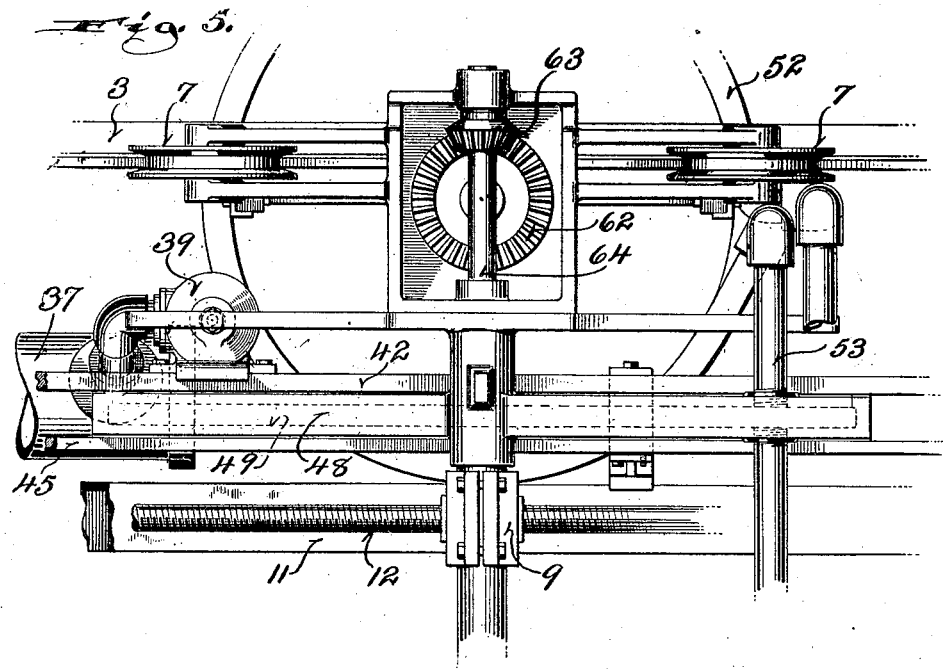
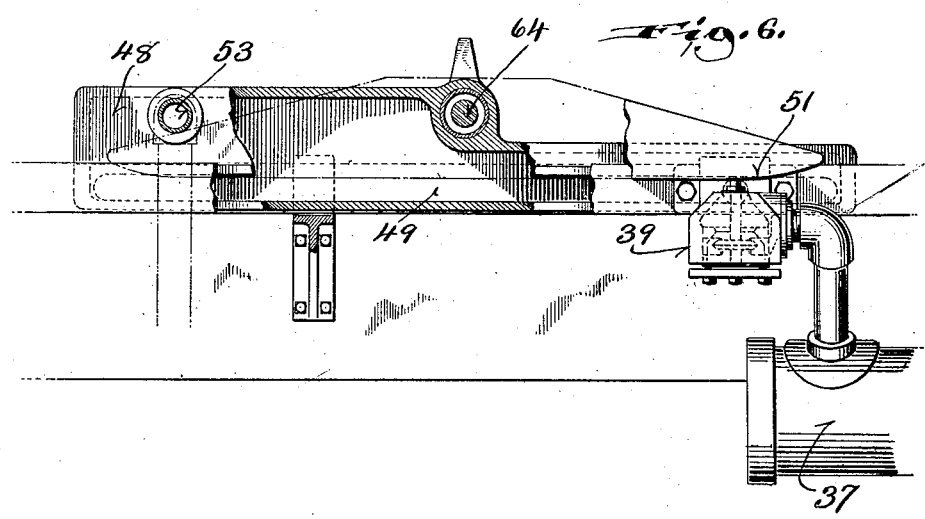

June 24, 1924.
W. F. NAULIN
1,499,026
MACHINE FOR OPERATING UPON MILK
Filed June 1, 1923 6 Sheets-Sheet 5
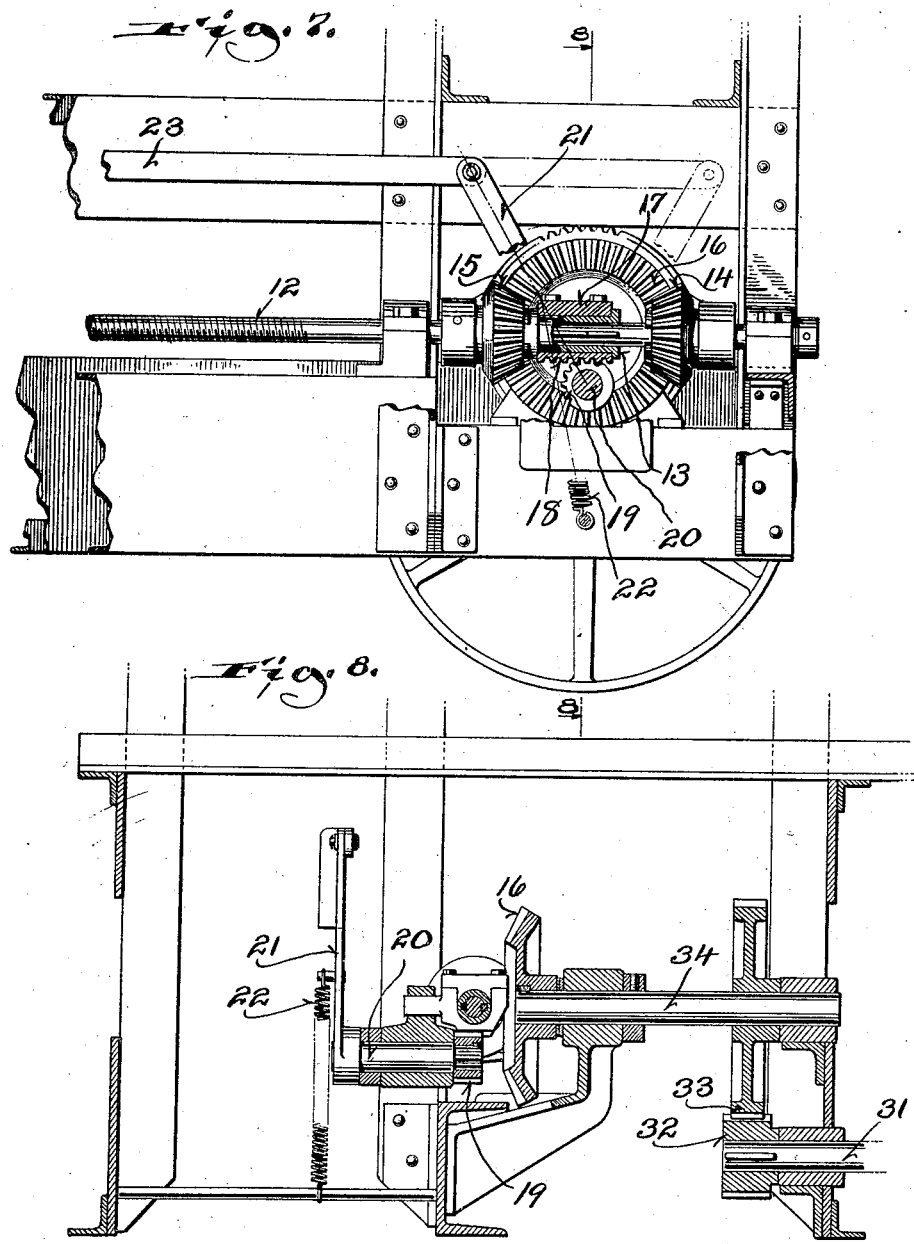
William F. Naulin June 24, 1924.
W. F. NAULIN
1,499,026
MACHINE FOR OPERATING UPON MILK
Filed June 1, 1923     6 Sheets-Sheet 6
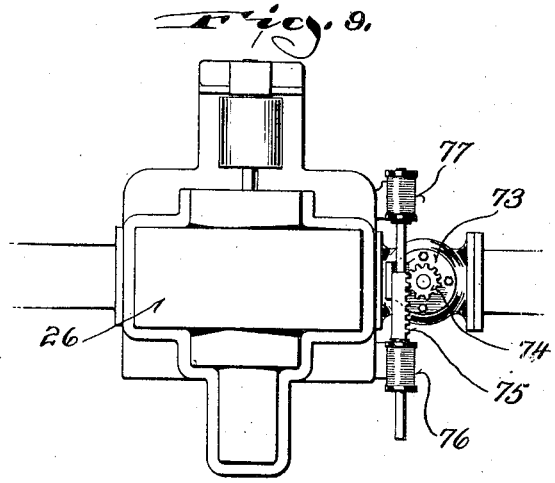
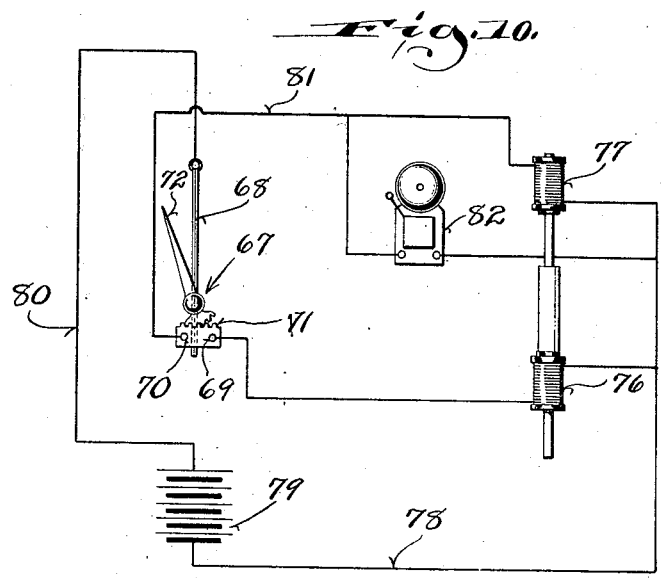
William F. Naulin Patented June 24, 1924.

1,499,026

UNITED STATES PATENT OFFICE.

WILLIAM F. NAULIN, OF NORTH MILWAUKEE, WISCONSIN.

MACHINE FOR OPERATING UPON MILK.

Application filed June 1, 1923. Serial No. 642,778.

*To all whom it may concern:*

Be it known that I, WILLIAM F. NAULIN, a citizen of the United States, and resident of North Milwaukee, in the county of Milwaukee and State of Wisconsin, have invented certain new and useful Improvements in Machines for Operating Upon Milk; and I do hereby declare that the following is a full, clear, and exact description thereof.

This invention relates to a machine for agitating and heating milk during one of the steps in the process of making cheese, and is directed to what is commonly known as a cream machine.

In the manufacture of cheese, it is necessary at one stage to heat the milk in a vat or tank and to agitate it at this time. This has, heretofore, been accomplished by supplying steam to an outer jacket of the tank and manually agitating the milk. It has been found that this process is not wholly successful for the reason that the milk immediately adjacent the heating elements or heated walls attains a very much higher temperature than the main body of the milk and consequently portions of the milk are subject to relatively high temperatures.

In addition to this the agitation is not thorough and does not prevent this undue and uneven heating of certain portions of the milk.

The net results of these defects are a decrease in the yield of cheese from a given quantity of milk and a falling off in the quality of the product.

It has been found that in practicing this old method the fats separate from the milk and may not, thereafter, be combined. They are, therefore, usually lost and do not combine in the production of a high grade of cheese.

This invention is designed to overcome the above enumerated defects, and objects of such invention are, therefore, to provide a machine which will uniformly heat and agitate the entire body of milk contained in a tank or vat, which will not allow any portion of the milk to become unduly heated at any stage in the process, which will not cause the separating of the fats from the main body of the milk, which agitates the milk immediately adjacent the point at which heat is applied, and which applies the heat to the main body of the milk in a uniform manner.

Further objects are to provide a machine which is extremely sanitary, which may be most readily cleaned, in which the constituent parts may be readily separated for cleaning or other purposes, and in which a smooth wall tank free from obstructions likely to retain contamination is provided.

Further objects are to provide a machine for agitating and heating milk, which is so organized that the milk is contained in an elongated tank and a traveling heating element is provided which is progressively worked up and down the tank and passes through the main body of the milk, in which means are provided for insuring a constant supply of steam to the heating elements, and in which an agitator is provided immediately adjacent the heating elements.

Further objects are to provide a machine for agitating and heating milk in which a maximum economy of steam consumption is attained, in which automatic means are provided for reversing the motion of the traveling heating and agitating elements.

Throughout this description the term milk will be employed to designate any of the usual materials employed in producing cheese, and is to be understood as meaning milk, cream and milk, curd or other similar material of this general nature.

An embodiment of the invention is shown in the accompanying drawings, in which:—

Figure 1 is a vertical elevation of the machine with parts broken away to more clearly illustrate the construction.

Figure 2 is an end view of the machine.

Figure 3 is an enlarged sectional view on the line 3—3 of Figure 1.

Figure 4 is a fragmentary further enlarged view corresponding roughly to Figure 3 and illustrating a section directly through the traveling heating and agitating elements.

Figure 5 is a fragmentary plan view of the structure shown in Figure 4.

Figure 6 is a sectional elevation on the line 6—6 of Figure 4.

Figure 7 is an elevation showing in detail the automatically reversing device for the lead screw.

Figure 8 is a sectional view on the line 8—8 of Figure 7.

Figure 9 is a view of the automatically actuating controlling valve.

Figure 10 is a diagrammatic view of the electrical circuits associated with the valve, thermostat and signal.

The machine comprises an elongated rectangular tank 1 adapted to contain the milk and carried by supports 2 which are positioned beneath such tank. Above the tank, tracks 3 are positioned and parallel such tank. Upper tracks 4 are mounted above the lower tracks 3. The entire set of tracks being carried by suitable frame work 5 extending downwardly from the ceiling of the room in which the machine is installed.

A truck, indicated generally at 6, is carried by a plurality of double flanged wheels 7 which are guided by the tracks 3 and 4, as may be clearly seen from Figures 1 and 3. This trunk is provided with a centrally located nut 8 which is loosely carried within a bracket 9 secured to the main body of the truck and is provided with a support roller 10 adapted to travel upon the upper flange 11 of a longitudinally extending stationary angle iron carried by the frame work 5, as may be seen from Figures 3 and 4. The nut 8 is threaded upon a longitudinally extending lead screw 12 which is located approximately centrally between the tracks (see Figures 1, 3, 4 and 5).

The movable element 13 of a clutch is loosely splined to the forward end of the lead screw, as may be seen from Figure 7, and is adapted to cooperate with correspondingly formed clutch members integral with bevel gears 14 and 15 loosely mounted upon the shaft or lead screw 12. These bevel gears 14 and 15 are permanently in mesh with a larger bevel gear 16 adapted to be driven in a manner hereinafter described. The clutch member or sleeve 13 is revolubly carried by a surrounding member 17 which, upon its lower face, is provided with rack teeth 18 cooperating with a small pinion 19. The pinion 19 is rigidly secured to a short transverse shaft 20 upon which an operating lever 21 is mounted, as may be seen from Figures 7 and 8.

The lever 21 has attached intermediate its ends one end of a tension spring 22, the other end of such tension spring being attached to a stationary portion of the machine, as shown in Figure 8. It is to be noted that the lower part of the spring 22 is below the shaft 20, consequently the lever 21 is caused to snap over from one portion to the other when it is operated, thereby giving a quick motion to the lever in a well known manner. An elongated rod 23 is pivotally guided by the upper end of the lever 21 and extends longitudinally of the machine. It is provided with a forward stop 24 and a rear stop 25 adapted to be engaged by the truck as it approaches the limits of its travel to thereby slide the rod 23 and operate the lever 21, thus throwing the lead screw into operative connection with either the gear 14 or 15 and thus automatically reversing the motion of the truck.

The preferred means for driving the beveled gear 16 is illustrated in Figures 1, 2 and 8 and comprises a steam turbine 26 provided with a driving pulley 27. This pulley is connected by means of a belt 28 with either the loose pulley 29 or the tight pulley 30 mounted upon a jack shaft 31. The inner end of the shaft 31 carries a pinion 32 which meshes with a gear 33 rigid upon a shaft 34 of the bevel gear 16. If desired a belt 35, (see Figure 2) may be provided and may extend from a line shaft and normally engage a loose pulley 36 mounted upon the shaft 31 so that the apparatus may be driven from a line shaft (not shown) when it is not desired to operate the turbine.

The exhausted steam from the turbine passes into a horizontally extending header 37 located between the tracks 3 (see Figures 1, 2, 3 and 4). This header is provided at regular spaced points with upwardly extending short pipes 38 which terminate in valves 39. The valves 39 include a valve member proper, 40, which is spring pressed toward closing position, as may be seen from Figure 4. A plunger or stem 41 extends upwardly and outwardly through the casing and is rigidly connected to the valve member 40. The valves 39 are bolted to the inner side of a longitudinally extending guide or slideway strip 42 (see Figures 4 and 5). An aperture 43 is provided for each of the outlets 44 of the valves and aligns therewith, as may be seen from Figure 4. A second longitudinally extending strip or guide 45 is provided and is located directly opposite the strip 42. The two guides 42 and 45 are carried by brackets 46 which are secured to the channel iron 11, such channel iron also supporting the header 37 through the medium of suitable hangers 47 (see Figure 4).

An elongated steam chest 48 is rigidly carried by the truck and is provided with an elongated aperture 49 (see Figures 4 and 6), which is adapted to communicate at all times with one of the apertures 43 through the guide 42, the remaining portion of the elongated aperture 49 being closed by the contacting face of the guide 42. In order to maintain a steam tight joint between the steam chest 48 and the guide 42 suitable screw adjustments, as illustrated at 50 in Figure 4, are provided for the guide strip 45 and are mounted in the bracket 46 so that the exact pressure between the steam chest and the guide 42 may be secured. A cam member 51 is integrally formed with the steam chest 48 and when the elongated aperture 47 aligns with one of the openings 43, this cam member will ride over and depress the valve stem 41 of the corresponding valve and allow steam to pass such valve and flow into the steam chest.

The truck carries a pair of heating coils 52 which are connected by means of pipes 53 with the steam chest 48. The other ends of the steam coils are connected with a steam trap 54 which may discharge in any suitable manner. In order to properly support the steam coils, a plurality of uprights 55 are provided and are carried by spiders 56 supported from the truck by means of a two part sleeve 57 detachably joined by a connecting union 58.

A shaft 59 extends downwardly through each of the sleeves 57 and is detachably joined to a lower extension 60. This lower extension carries a rotary agitator 61 which, in the form shown, is in the nature of a paddle wheel,—the agitator and shafts being carried and supported by suitable bearings, as illustrated in Figure 4. The upper ends of the shafts 59 are provided with bevel wheels 62, which mesh with bevel wheels 63 rigidly carried by a transverse shaft 64. Adjacent the outer end of the shaft 64, a gear 65 is secured and meshes with a stationary rack 66 bolted to one of the rails such as the rail 3 (see Figure 4). It will be seen, therefore, that when the truck travels along the tracks, that the agitators 61 are rotated and maintain a rapid circulation of the milk immediately around the heating coils while such coils are bodily moved through the milk.

Automatic means are provided for stopping the machine and signalling when the desired temperature has been attained. This is accomplished by providing a thermostat indicated generally at 67 ( see Figures 1 and 10), such thermostat conveniently embodying a deflecting element 68 adapted to contact with either of two contacts 69 and 70 carried by an adjustable slide 71. This slide may conveniently be set by means of a co-operating pointer 72 in a manner illustrated in Figure 10. An automatic control valve 73 is provided in the supply pipe for the steam turbine 26 (see Figure 9) and its stem is equipped with a pinion 74 meshing with a rack 75. The rack is oscillated by means of solenoids 76 and 77 so as to respectively open and close the valve upon the energization of these solenoids.

As shown in Figure 10, the solenoid 76 is connected to the contact 69 and thence by means of the conductor 78 to a source of electrical energy such as a battery 79 or power main. The other side of the battery or main being connected by means of the conductor 80 with the movable portion 68 of the thermostat. A conductor 81 extends from the contact 70 to one side of the solenoid 77, the other side of such solenoid being connected to the return conductor 78, as illustrated. A signal device, such as the bell 82, is arranged in parallel to the solenoid 77, so that when such solenoid is energized and the valve closed, a signal will also be given.

The operation of the machine is as follows: When it is desired to operate the machine, the solenoid 76 is energized in any suitable manner, as for example by rocking the pointer 72 to the right, thus opening the valve 73 and starting the turbine. Thereafter, the pointer may be set to the exact temperature at which it is desired to stop the operation of the machine. The belt 28 is moved to the tight pulley 30 and through reduction mechanism rotates the lead screw 12 thus causing the truck 6 to travel lengthwise of the tank. When the truck arrives at the end of its stroke, it engages one of the stops 24 or 25 and, through the medium of the rod 23 and the quick acting lever 21, reverses the direction of the rotation of the lead screw 12, thus reversing the motion of the truck. As the truck travels back and forth rotary motion will be imparted to the agitator 61 through the medium of the rack 66 and the gear. As the truck travels back and forth, the appropriate valve is opened by the cam 51 as described, and steam is admitted to the steam chest and from thence to the steam coil. It it to be noted that the proportioning of the elongated aperture 49 in the steam chest is such that one valve is always in communication with the steam chest. Just before the aperture 49 leaves the corresponding aperture 43 with which it is in communication, the appropriate valve is closed as the cam member 51 moves from contact with the valve spindle and the next or succeeding valve is engaged by the cam member and communicates with the aperture 49. When the machine has operated for a sufficient time to attain the exact temperature desired, the thermostat operates and energizes the solenoid 77 and the signal 82 thus simultaneously stopping the operation of the machine and giving the signal for the attendant. It is to be particularly noted that the heating of the milk is not excessive for any portion of the milk whatsoever, as the bodily travel of the heating coils and the active agitation of the milk immediately adjacent such coils by means of the mechanical agitators insures a rapid circulation of the milk adjacent the heating coils and also insures a uniform distribution of heat throughout the mass of milk. Under certain conditions, it may be desirable to merely drive the heating coils back and forth through the milk with the agitators removed. This may be readily accomplished by detaching the unions 58 which hold the heating coils supporting frames and detaching the unions of the heating coils. The coils and agitators may then be removed and when the agitators have been removed from the interior of the coils, the coils may be replaced in an obvious manner. Thereafter, it may also be desirable to drive these coils back and forth through the material without applying heat thereto. This may be accomplished by driving the fast pulley 30 (see Figure 2) by means of the belt 35 from a line shaft without employing the turbine 36. This last operation is sometimes desirable when it is necessary to break up the material which has begun to solidify within the tank 1, and may be most readily accomplished as described. Also the ready removal of the heating coils and agitator facilitates cleaning of the machine as it then leaves the tank unobstructed throughout, and also provides for the easy cleaning of the coils and agitators.

It will thus be seen that a machine for heating and agitating milk has been provided which is wholly automatic in its action, which does not unduly heat any portion of the milk, but which secures a uniform heating of the milk to the exact temperature desired.

It will also be seen that a machine has been provided which will operate without necessitating the presence of an attendant, which will automatically stop functioning and stop the supply of heating fluid when the exact desired conditions have been attained.

Although one specific form of the invention has been described in considerable detail, it is to be understood that the invention may be variously embodied and is to be limited only as claimed.

I claim:

1. A machine for agitating and heating milk comprising an elongated tank, a truck adapted to travel along said tank, heating means and agitating means carried by said truck and projecting into said tank, and means for operating said agitating means.

2. A machine for agitating and heating milk comprising an elongated tank, a truck adapted to travel along said tank, heating means and agitating means carried by said truck and projecting into said tank, and means for operating said agitating means, said agitator being detachably joined to said last mentioned means.

3. A machine for agitating and heating milk comprising an elongated tank, a truck adapted to travel back and forth above said tank, heating means carried by said truck and projecting into said tank, a rotary agitator carried by said truck and projecting into said tank and located adjacent said heating means, and driving mechanism for rotating said agitator.

4. A machine for agitating and heating milk comprising an elongated tank, a truck adapted to travel back and forth above said tank, a heating coil carried by said truck and projecting into said tank, a rotary agitator carried by said truck and surrounded by said coil, and means for rotating said agitator.

5. A machine for agitating and heating milk comprising an elongated tank, tracks paralleling said tank, a truck adapted to travel along said tracks, means for driving said truck, a coil of heating pipe carried by said truck and extending into said tank, a shaft extending into said coil, a rotary agitator driven from said shaft and located within said coil, a stationary rack, and gearing connecting said rack and shaft, whereby said agitator is rotated as said truck travels along said tracks.

6. A machine for agitating and heating milk comprising an elongated tank, tracks paralleling said tank, a truck adapted to travel upon said tracks, a lead screw for operating said truck, power driven gearing for rotating said lead screw, automatic mechanism for reversing said lead screw when the truck approaches the ends of its travel, a steam coil carried by said truck and extending into said tank, means for supplying steam to said coil in all positions of said truck, a rotary adjuster positioned within said coil, a stationary rack paralleling said tracks, and mechanism operatively joining said agitator and rack, whereby as said truck travels back and forth along said tracks said agitator is rotated.

7. A machine for agitating and heating milk comprising a tank, a truck having translatory motion relative to said tank, a heating coil carried by said truck and projecting into said tank, steam supply means, and a steam chest connected to said coil, carried by said truck and communicating with said steam supply.

8. A machine for agitating and heating milk comprising a tank, a truck having translatory motion relative to said tank, a steam chest carried by said truck, a heating coil carried by said truck, connected to said steam chest and projecting into said tank, and steam supply means having a sliding engagement with said steam chest.

9. A machine for treating milk comprising an elongated tank, a truck adapted to travel back and forth adjacent said tank, a steam chest carried by said truck, a steam coil connected to said steam chest, carried by said truck and projecting into said tank, an elongated guide having sliding steam-tight engagement with said chest, and steam supply means opening through said guide.

10. A machine for treating milk comprising an elongated tank, a truck adapted to travel back and forth adjacent said tank, a steam chest carried by said truck and having an elongated opening, an elongated guide having sliding steam-tight engagement with said chest and sealing said elongated opening and having an opening therethrough adapted to communicate with said elongated opening, and steam supply means communicating with the opening through said guide.

11. A machine for treating milk comprising an elongated tank, a truck adapted to travel back and forth adjacent said tank, a steam chest carried by said truck and having an elongated opening, a steam coil carried by said truck, connected to said chest, and projecting into said tank, an elongated guide having steam-tight sliding engagement with said chest and having a plurality of apertures therethrough adapted to successively communicate with said elongated aperture, a steam header, a plurality of valves positioned between and connecting said plurality of apertures and said header, and cam means carried by said truck for successively opening said valves.

12. A machine for treating milk comprising an elongated tank, a truck adapted to travel back and forth adjacent said tank, a steam chest carried by said truck and having an elongated opening, a steam coil carried by said truck, connected to said chest, and projecting into said tank, an elongated guide having steam-tight sliding engagement with said chest and having a plurality of apertures therethrough adapted to successively communicate with said elongated aperture, a steam header, a plurality of valves positioned between and connecting said plurality of apertures and said header, resilient means for maintaining said valves normally closed, and cam means carried by said truck for successively opening said valves.

In testimony that I claim the foregoing I have hereunto set my hand at Milwaukee, in the county of Milwaukee and State of Wisconsin.

WILLIAM F. NAULIN.